(12) United States Patent
Olang (10) Patent No.: US 8,604,091 B2
(45) Date of Patent: Dec. 10, 2013

(54) NON-ISOCYANATE SPRAY FOAM (75) Inventor: Fatemeh Nassreen Olang, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 138 days.

(21) Appl. No.: 13/221,373

(22) Filed: Aug. 30, 2011

(65) Prior Publication Data

US 2012/0059076 A1    Mar. 8, 2012

Related U.S. Application Data (60) Provisional application No. 61/379,936, filed on Sep. 3, 2010.

(51) Int. Cl.
*C08G 69/48* (2006.01)
*C08G 71/04* (2006.01)
*C08J 9/06* (2006.01)

(52) U.S. Cl.
USPC ............ 521/76; 521/70; 521/50; 521/65; 521/116; 521/130; 521/183; 264/35; 264/46.4

(58) Field of Classification Search
USPC .............................. 521/70, 72, 76
See application file for complete search history.

(56) References Cited

U.S. PATENT DOCUMENTS

| | | | |
|---|---|---|---|
| 4,576,998 A * | 3/1986 | Ellerbe et al. ............... | 525/455 |
| 5,175,231 A | 12/1992 | Rappoport et al. | |
| 6,120,905 A | 9/2000 | Figovsky | |
| 6,218,500 B1 | 4/2001 | Keute et al. | |
| 6,407,198 B1 | 6/2002 | Figovsky et al. | |
| 6,730,711 B2 | 5/2004 | Sasabe et al. | |
| 6,960,619 B2 | 11/2005 | Figovsky et al. | |
| 7,045,577 B2 | 5/2006 | Wilkes et al. | |

(Continued)

FOREIGN PATENT DOCUMENTS

| | | |
|---|---|---|
| SU | 796359 B | 1/1981 |
| WO | 2007062812 A1 | 6/2007 |

OTHER PUBLICATIONS

Delebecq, E.; Pascault, J.; Boutevin, B.; Ganachaud, F. "On the versatility of urethane/urea bonds: reversibility, blocked isocyanate, and non-isocyanate polyurethane" Chemical Reveiws 2013, 113, pp. 80-118.*

(Continued)

*Primary Examiner* — Randy Gulakowski
*Assistant Examiner* — Christina Wales
(74) *Attorney, Agent, or Firm* — Calfee, Halter & Griswold LLP (57) ABSTRACT

One- and two-part spray non-isocyanate foams that include an amide-based oligomer containing pendant carboxylic acid and a polyfunctional aziridine crosslinking agent is provided. The amide oligomer typically contains urea links, urethane links or both groups. Additionally, the foams may include one or more plasticizer, a non-functionalized resin, a surfactant, and/or a thickening agent or rheology modifier. The amide oligomer does not contain any isocyanate groups, and, as a result, there are no free isocyanate moieties generated during formation of the foam that may be potentially hazardous to workers installing the foam. The presence of the urethane segments on the oligomer permits for the generation of a polyurethane foam without the drawbacks of conventional polyurethane foams. The foams may be used to fill cavities, cracks, gaps and crevices, such as around windows and doors, and may also be used in flash and batt systems.

17 Claims, 3 Drawing Sheets

(56) References Cited

U.S. PATENT DOCUMENTS

| | | |
|---|---|---|
| 7,232,877 B2 | 6/2007 | Figovsky et al. |
| 2002/0025990 A1* | 2/2002 | Fujita et al. .................. 521/173 |
| 2004/0025462 A1 | 2/2004 | Meier |
| 2004/0091982 A1 | 5/2004 | Gee et al. |
| 2004/0236119 A1 | 11/2004 | Van Holen |
| 2005/0113594 A1 | 5/2005 | Van Holen |
| 2006/0084711 A1* | 4/2006 | Stanjek et al. ................ 521/154 |
| 2007/0135588 A1 | 6/2007 | Diakoumakos et al. |
| 2008/0076842 A1* | 3/2008 | Ferenz et al. .................. 521/88 |
| 2008/0161430 A1* | 7/2008 | Korwin-Edson et al. ....... 521/70 |
| 2009/0170974 A1 | 7/2009 | De Schrijver et al. |
| 2009/0312502 A1 | 12/2009 | Bernard |
| 2011/0166245 A1* | 7/2011 | Kunihiro et al. .............. 521/172 |
| 2011/0224317 A1* | 9/2011 | O'Leary ......................... 521/70 |

OTHER PUBLICATIONS

Kathalewar, M.S.; Joshi, P.B.; Sabnis, A.S.; Malshe, V.C. "Non-isocyanate polyurethanes: from chemistry to applications" RSC Advances, 2013, 3, pp. 4110-4129.*

International Search Report and Written Opinion, Application No. PCT/US11/049932, dated Jan. 12, 2012.

* cited by examiner

Figure 1

(Prior Art)

STEP 1

STEP 2

Figure 2

STEP ONE

STEP TWO

Figure 3

NON-ISOCYANATE SPRAY FOAM

CROSS-REFERENCE TO RELATED APPLICATIONS

This application claims priority from provisional application 61/379,936 filed Sep. 3, 2010, pending, which is incorporated herein in its entirety.

TECHNICAL FIELD AND INDUSTRIAL APPLICABILITY OF THE INVENTION

The present invention relates generally to spray foams and, more particularly, to user-friendly foams based on urea or urethane oligomers having pendant carboxyl groups crosslinked with polyfunctional aziridines. The foams may be used to fill cavities, cracks, and crevices to enhance the sealing and insulating properties of buildings. The spray foams can be formed of one or two parts. The foamable compositions contain a urethane oligomer containing pendant carboxylic acid groups, a polyfunctional aziridine crosslinking agent, a blowing agent(s), and optionally a plasticizer, a surfactant and/or a rheology modifier. Methods of making such foams are also provided.

BACKGROUND OF THE INVENTION

Spray foams have found widespread utility in the fields of insulation and structural reinforcement. For example, spray foams are commonly used to insulate or impart structural strength to items such as automobiles, hot tubs, refrigerators, boats, and building structures. In addition, spray foams are used in applications such as cushioning for furniture and bedding, padding for underlying carpets, acoustic materials, textile laminates, and energy absorbing materials. Currently, spray foams, especially those used as insulators or sealants for home walls, are polyurethane spray foams.

Polyurethane spray foams and their methods of manufacture are well known. Although one-part spray foams are known, more typically, polyurethane spray foams are formed from two separate components, commonly referred to as an "A" side and a "B" side, that react when they come into contact with each other. The first component, or the "A" side, contains an isocyanate such as a di- or poly-isocyanate that has a high level of reactive isocyanate groups (—N=C=O or NCO) on the molecule. The second component, or "B" side, contains nucleophilic reagents such as polyols that include two or more hydroxyl groups, silicone-based surfactants, blowing agents, catalysts, and/or other auxiliary agents. The nucleophilic reagents are generally polyols, primary and secondary polyamines, and/or water. Preferably, mixtures of diols and triols are used to achieve the desired foaming properties. The overall polyol hydroxyl number is designed to achieve a 1:1 ratio of first component to second component (A:B).

The two components are typically delivered through separate lines into a spray gun such as an impingement-type spray gun. The first and second components are pumped through small orifices at high pressure to form separate streams of the individual components. The streams of the first and second components intersect and mix with each other within the gun and begin to react. The heat of the reaction causes the temperature of the reactants in the first and second components to increase. This rise in temperature causes the blowing agent located in the second component (the "B" side) to vaporize and form a foam mixture. As the mixture leaves the gun, the mixture contacts a surface, sticks to it, and continues to react until the isocyanate groups have completely reacted. The resulting resistance to heat transfer, or R-value, may be from 3.5 to 8 per inch.

There are several problems associated with conventional isocyanate-based polyurethane spray foams. One major problem associated with conventional polyurethane spray foams is that the first component (the "A" side) contains high levels of free monomeric methylene-diphenyl-di-isocyanate (MDI). When the foam reactants are sprayed, the MDI monomers form droplets that may be inhaled by workers installing the foam if stringent safety precautions are not followed. Even a brief exposure to isocyanate monomers may cause difficulty in breathing, skin irritation, blistering and/or irritation to the nose, throat, and lungs. Extended exposure of these monomers can lead to a sensitization of the airways, which may result in an asthmatic-like reaction and possibly death.

An additional problem with such conventional polyurethane spray foams is that residual polymeric methylene-diphenyl-di-isocyanate (PMDI) that is not used is considered to be a hazardous waste. PMDI typically has an NCO of about 20%. In addition, PMDI can remain in a liquid state in the environment for years. Therefore, specific procedures must be followed to ensure that the PMDI waste product is properly and safely disposed of in a licensed land fill. Such precautions are both costly and time consuming.

Attempts have been made to reduce or eliminate the presence of free isocyanate monomers and/or isocyanate emission by spray foams into the atmosphere. For example, latex foams have been used to reduce or eliminate the presence of isocyanate and/or isocyanate emission by spray foams. Typical plural component latexes are supplied with a latex as the major component in the "A" side and a crosslinking agent as the minor component in the "B" side. The crosslinking agent in the latex spray foams is generally highly reactive. Thus, the crosslinking agent is generally supplied neat (i.e., not in solution). Additionally, the high reactivity of the crosslinking agent may reduce the stability and result in a short shelf life of the foamable material.

Additionally, attempts have been made to utilize pre-polymerization to lower the concentration of diisocyanate monomers. Although these pre-polymers for spray foams contain low concentrations of diisocyanate monomers, they still contain isocyanate groups. Thus, these foams may be better than conventional polyurethane foams from a toxicological point of view, but are still considered hazardous. In addition, such foams do not solve the waste problems discussed above. Nor have such foams achieved toxicological acceptance.

One attempt to eliminate isocyanate from foams is to make a polyurethane without the use of isocyanate. Such a non-isocyanate polyurethane (NIPU) may be made via the reaction of cyclic carbonates and diamines, as is disclosed in U.S. Pat. No. 5,175,231 to Rappoport, et al.

Figure 1:
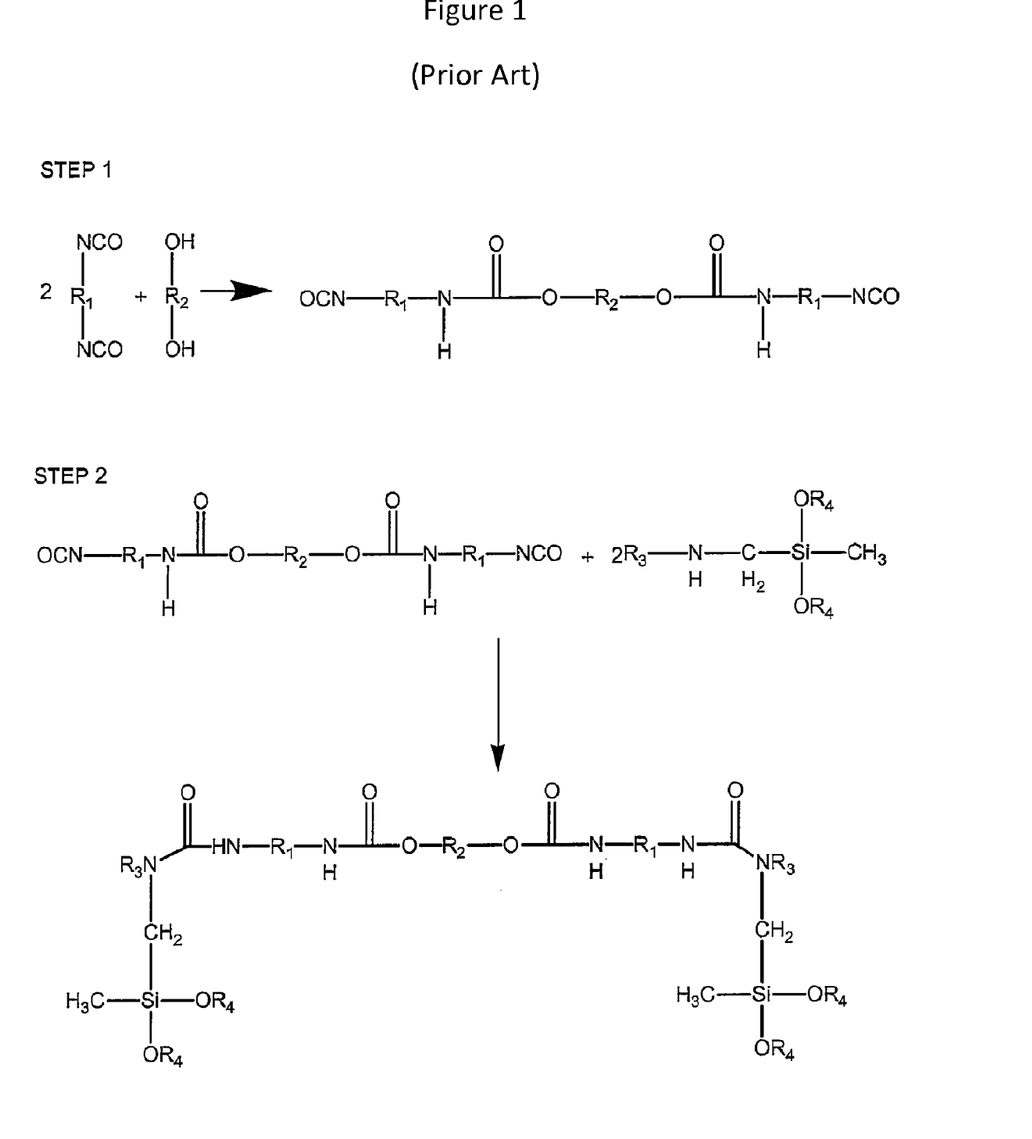
FIG. 1 is a schematic illustration depicting a prior art chemical reaction forming a urethane oligomer having ends capped with siloxy groups.

A further attempt to eliminate the presence of isocyanate groups is to block existing isocyanate groups on the pre-polymers with other reactive and non-hazardous functional groups. One such example is depicted in FIG. 1. Such pre-polymers do not crosslink via isocyanate groups and are thus toxicologically acceptable. In addition, mixtures formed with these blocked pre-polymers can be used to produce spray foams, which in the cured state, may have properties similar to conventional isocyanate-containing polyurethane foams. Further, one-component spray foam systems can be formulated using these blocked pre-polymers that cure exclusively through contact with atmospheric moisture.

Step 1 of FIG. 1 illustrates the reaction of two diisocyanate molecules with a polyol to form an oligomer or pre-polymer. This reaction is repeated until the desired pre-polymer length is achieved. In Step 2, the isocyanate terminated oligomer is reacted with siloxy groups to produce urethane oligomers having siloxy-terminated ends and therefore, the pre-polymer contains no isocyanate end groups. The oligomers are crosslinked by a reaction between the siloxy-terminated groups and water (e.g., moisture in the air).

Despite attempts to reduce or eliminate the use of isocyanate in spray foams and/or reduce isocyanate emission into the air, there remains a need in the art for a spray foam that is non-toxic, environmentally friendly, and stable over time.

SUMMARY OF THE INVENTION

In a first aspect, the invention relates to a foamable composition for forming a non-isocyanate foam comprising:
a first component including at least one amide-based oligomer containing pendant carboxylic acid groups and no isocyanate groups; and a second component including a polyfunctional aziridine crosslinking agent that crosslinks with carboxylic acids groups rapidly at or about room temperature, wherein at least one of said first and said second component contains a blowing agent, and wherein the first and second components are isolated from one another until a foaming reaction is desired.

For example, a foamable composition may include an amide-based oligomer containing pendant carboxylic acid having the following formula:

wherein $R^1$ is an alkyl, cycloalkyl or aromatic group; $R^2$ is a polyether, a polyester, a polyether-polyester blend, a caprolactone or an alkyl, cycloalkyl, or aromatic group; and $R^3$ is selected from glycerin or oligomers thereof, an alkyl, aromatic, or cycloaliphatic group; and wherein the "~~~COOH" represent potential locations of pendant —COOH groups, provided that at least one of $R^1$, $R^2$ and $R^3$ contains at least one —COOH group, wherein X and Z are independently selected from NH or O, and wherein n is an integer from about 1 to about 50, or from about 2 to about 30, or from about 3 to about 20.

In some embodiments where X=O or Z=O, there are carbamate or urethane links within the oligomer, and the oligomer may be referred to as a urethane pre-polymer or a urethane oligomer. In some other embodiments where X=NH or Z=NH, there are double amide or urea links within the oligomer, and the oligomer may be referred to as a urea oligomer. In yet other embodiments, both NH and O may occupy the X or Z positions and the oligomer may be a hybrid having both types of linkages.

The foamable composition may be prepared in one or two parts, provided the reactive components of crosslinking reaction (e.g. the pendant COOH and the polyfunctional aziridines) are isolated from one another until the crosslinking reaction is to be initiated. In one part, the isolation is typically effected by a non-reactive, protective shell encapsulating one or both of the reactive ingredients. In two parts, the isolation is typically effected by putting one reactive ingredient in the A-side and the other reactive ingredient in the B-side.

Either component may further include a plasticizer and/or a surfactant. Often the second component will include a plasticizer (aka second plasticizer) that has no acidic protons to react with said polyfunctional aziridine crosslinking agent, and that may optionally be selected from the group consisting of a benzoate ester, triethyl citrate, a tributyl citrate, polyethylene glycol, an octylphenoxypolyethoxyethanol, butyl benzoate and combinations thereof.

The blowing agent may be selected from the group consisting of a single chemical compound that generates a gas upon heating, irradiation, or photo initiation, two or more chemicals that form a gas upon mixing and a phase change blowing agent.

The foamable composition may optionally further comprises one or more members selected from the group consisting of surfactants, thickening agents or rheology modifiers, plasticizers, foam promoters, opacifiers, accelerators, foam stabilizers, dyes, color indicators, gelling agents, flame retardants, biocides, fungicides, algaecides and fillers.

In another aspect, the invention relates to a non-isocyanate foamed product comprising the reaction product of the first and second components of the compositions described above.

In yet another aspect, the invention relates to a method of forming a non-isocyanate foam comprising:
mixing together (i) a first component including at least one amide-based oligomer containing pendant carboxylic acid groups; (ii) a second component containing a polyfunctional aziridine crosslinking agent that crosslinks rapidly at or about room temperature, and (iii) a blowing agent to form a foamable reaction mixture;
applying the reaction mixture to a desired substrate;
initiating a blowing reaction whereby the blowing agent forms a gas; and
permitting the crosslinking agent to chemically react with and crosslink the pendant carboxylic acid groups on the amide-based oligomer while the blowing agent forms a gas to form a foam.

As noted earlier, the mixing may result from combination of an A-side with a B-side, or from disruption of a protective encapsulating shell around some of the reactive ingredients. The mixing may further comprise an application device, and may involve spraying the foamable composition onto substrates such as wall cavities or cracks, gaps and crevices in or between structural components and/or wall panel structures.

Other advantages and objects may include the viscosities of the first and second components can be adjusted by addition of plasticizers or fillers such that the two components can be properly mixed to form an homogeneous mixture.

It is also an object of the present invention to provide a foamed product comprising the reaction product of (1) a first component including at least one urethane oligomer containing pendant carboxylic acid and optionally one or more of a a plasticizer, and a surfactant and (2) a second component including a polyfunctional aziridine crosslinking agent that crosslinks at, about, or below room temperature and optionally a plasticizer that has no acidic protons to react with the polyfunctional aziridine crosslinking agent. The second component may further include a non-functionalized resin that is non-reactive with the polyfunctional aziridine crosslinking agent. The plasticizer in the second component has no acidic protons to react with the polyfunctional aziridine crosslinking agent. The presence of the plasticizers permit for the inclusion of coacervating agents, fillers, nucleating agents and/or foaming agents in the first and second components. In at least one exemplary embodiment, the plasticizer in the second component is a benzoate ester and the benzoate ester reduces the presence of ethyleneimine in the second component to less than about 1 ppm.

It is yet another object of the present invention to provide a method of forming a non-isocyanate foam that includes (1) delivering a first component that includes at least one urethane oligomer containing pendant carboxylic acid through a first delivery line to an application device, (2) delivering a second component that includes a polyfunctional aziridine crosslinking agent that crosslinks at, about, or below room temperature to the application device, where one of the first and second component further includes a blowing agent, (3) mixing the first and second components within the application device to form a reaction mixture, and (4) permitting the crosslinking agent and the urethane oligomer containing pendant carboxylic acid to chemically react while the blowing agent forms a gas to initiate a foaming reaction and form a foam.

It is a further object of the present invention to provide a method of preparing a one-part non-isocyanate foam that includes (1) mixing a polyfunctional aziridine crosslinking agent encapsulated in an encapsulating shell and at least one urethane oligomer containing pendant carboxylic acid and a blowing agent to form a one-part reaction mixture, where the crosslinking agent crosslinks at, about, or below room temperature, (2) releasing the polyfunctional aziridine crosslinking agent from the encapsulating shell, and (3) permitting the polyfunctional aziridine crosslinking agent and the at least one urethane oligomer containing pendant carboxylic acid to chemically react while concurrently allowing the blowing agent to form a gas to initiate a foaming reaction and create a non-isocyanate foam. The urethane oligomer containing pendant carboxylic acid has no free isocyanate groups. In one or more exemplary embodiment, the first component further includes a first plasticizer and/or a surfactant and the second component further includes a second plasticizer and/or a non-reactive resin. The second plasticizer has no acidic protons to react with the polyfunctional aziridine crosslinking agent.

It is an advantage of the present invention that the inventive foamable compositions may be made in one- or two-part formulations, provided the two reactive parts are isolated prior to reaction time. The isolation may be by encapsulation or by placing the reactive components in separately formulated parts A and B.

It is an advantage of the present invention that the inventive foams do not contain the harmful chemicals found in conventional polyurethane spray foams, such as, for example, MDI monomers. As a result, the foams of the present invention do not contain harmful vapors that may cause skin or lung sensitization or generate toxic waste.

It is also an advantage of the present invention that the spray foams do not emit harmful vapors into the air when the foam is sprayed, such as when filling cavities to seal and/or insulate a building. The inventive foams are safe for workers to install and, therefore, can be used both in the house renovation market and in occupied houses.

It is another advantage of the present invention that the foams may be applied using existing spray equipment designed for conventional one or two-part spray polyurethane foam systems without clogging the spray equipment. Thus, the application gun is capable of repeated use without clogging and the resulting necessary cleaning when the foams of the present invention are utilized. Additionally, because there are no harmful chemicals in the inventive foams, the foams can be safely disposed without having to follow any stringent hazardous waste disposal precautions.

It is also another advantage that polyurethane oligomers have no free isocyanate monomers and therefore eliminate the presence of isocyanates during installation of the foam.

It is a further advantage of the present invention that the inventive foams can be used in virtually any application, such as spray, molding, extrusion, and injection molding (e.g., reaction injection molding (RIM)) applications. The foam may be used to fill cavities, cracks, and crevices to enhance the sealing and insulating properties of buildings, cars, and appliances.

It is yet another advantage of the present invention that the components of the B-side of the foam compositions may be stored for extended periods of time without significant reaction until the composition is used when the polyfunctional aziridine crosslinking agent is diluted and the B-side components do not contain any acidic protons.

It is a feature of the present invention that coacervating agents, fillers, nucleating agents, and/or foaming agents can be added to the B-side when the polyfunctional aziridine crosslinking agent is diluted.

It is a further feature of the present invention that the viscosity of the B-side can be adjusted by diluting the polyfunctional crosslinking agent with a plasticizer or by addition of fillers.

It is yet another feature of the present invention that the foam acts as a first defence for pest control.

It is also a feature of the present invention that the foam compositions may be used to fill open or closed cavities or to fill cracks and crevices.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

DETAILED DESCRIPTION OF THE INVENTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, and any other references, are each incorporated by reference in their entireties, including all data, tables, figures, and text presented in the cited references.

The terms "foamable composition" and "foam composition" may be interchangeably used in this application. In addition, the terms "urethane oligomer containing pendant carboxylic acid" and "polyurethane oligomer" may be interchangeably used herein. When identifying substituents, R, the use of a subscript numeral or a superscript numeral are used interchangeably, in both cases to distinguish one R substituent from another and not to represent that multiple R groups are attached.

The present invention relates to one-part and two-part foamable compositions. The foams may be used to fill cavities of buildings to improve the sealing and insulation properties. The foams may be sprayed into closed cavities via small orifices, or into open cavities having a side of face open and not yet closed off. Additionally, the inventive foams may be used to seal gaps, cracks and crevices, such as those around windows and doors. The inventive foams can be used in spray, molding, extrusion, and injection molding (e.g., reaction injection molding (RIM)) applications. In one exemplary embodiment, the inventive foam is formed from two components, namely, an A-side and a B-side. In particular, the A-side of the foam composition includes a polyurethane oligomer and optionally a plasticizer and/or surfactant and the B-side contains a polyfunctional aziridine crosslinking agent and optionally one or more of a plasticizer, a surfactant, and a non-reactive resin. The urethane oligomer may be made via a conventional isocyanate pathway (e.g., reaction of polyols and isocyanates) or through non-isocyanate reactions (e.g., reaction of cyclic carbonates and diamines). At least one blowing agent is present in the A-side and/or B-side. The A-side and/or B-side may also contain coacervating agents, fillers, nucleating agents, rheology modifiers and/or foaming agents.

As discussed above, the A-side of the composition includes an amide-based oligomer having the generic formula set forth in Formula I:

wherein $R^1$ is an alkyl, cycloalkyl or aromatic group; $R^2$ is a polyether, a polyester, a polyether-polyester blend, a caprolactone or an alkyl, cycloalkyl, or aromatic group; $R^3$ is selected from glycerin or oligomers thereof, an alkyl, aromatic, or cycloaliphatic group;

wherein the "~~~COOH" represent potential locations of pendant —COOH groups, provided that at least one of $R^1$, $R^2$ and $R^3$ contains at least one —COOH group, wherein X and Z are independently selected from NH or O, and wherein n is an integer from about 1 to about 50.

In at least one embodiment, X=O and Z=O, making a urethane oligomer. In another embodiment, X=NH and Z=NH, making a urea oligomer. In other embodiments forming hybrid urea-urethane oligomers, X=O and Z=NH or X=NH and Z=O.

As shown in generic formula I, a portion of the polymer designated in brackets may be repeated n times, with n being an integer from 1 to about 50, or from about 2 to about 30 or from about 3 to about 20. In reality, polymerization reactions like those depicted in FIG. 1 may produce oligomers having variable lengths. Viscosity is a key determinant in determining the choice of n; the higher the n, the higher the viscosity.

In at least one exemplary embodiment, the oligomer has the polyurethane formula set forth in Formula II:

where $R^1$ is an alkyl, cycloalkyl or aromatic group; $R^2$ is a polyether, a polyester, a caprolactone or an alkyl, cycloalkyl, or aromatic group; and $R^3$ is glycerin or oligomers thereof, or an alkyl, aromatic, or cycloaliphatic group; and wherein the "~~~COOH" represent potential locations of pendant —COOH groups, provided that at least one of $R^1$, $R^2$ and $R^3$ contains at least one —COOH group; and n is defined above. In addition, at least one of $R^1$, $R^2$, and $R^3$ may optionally contain urethane segments.

Figure 2:
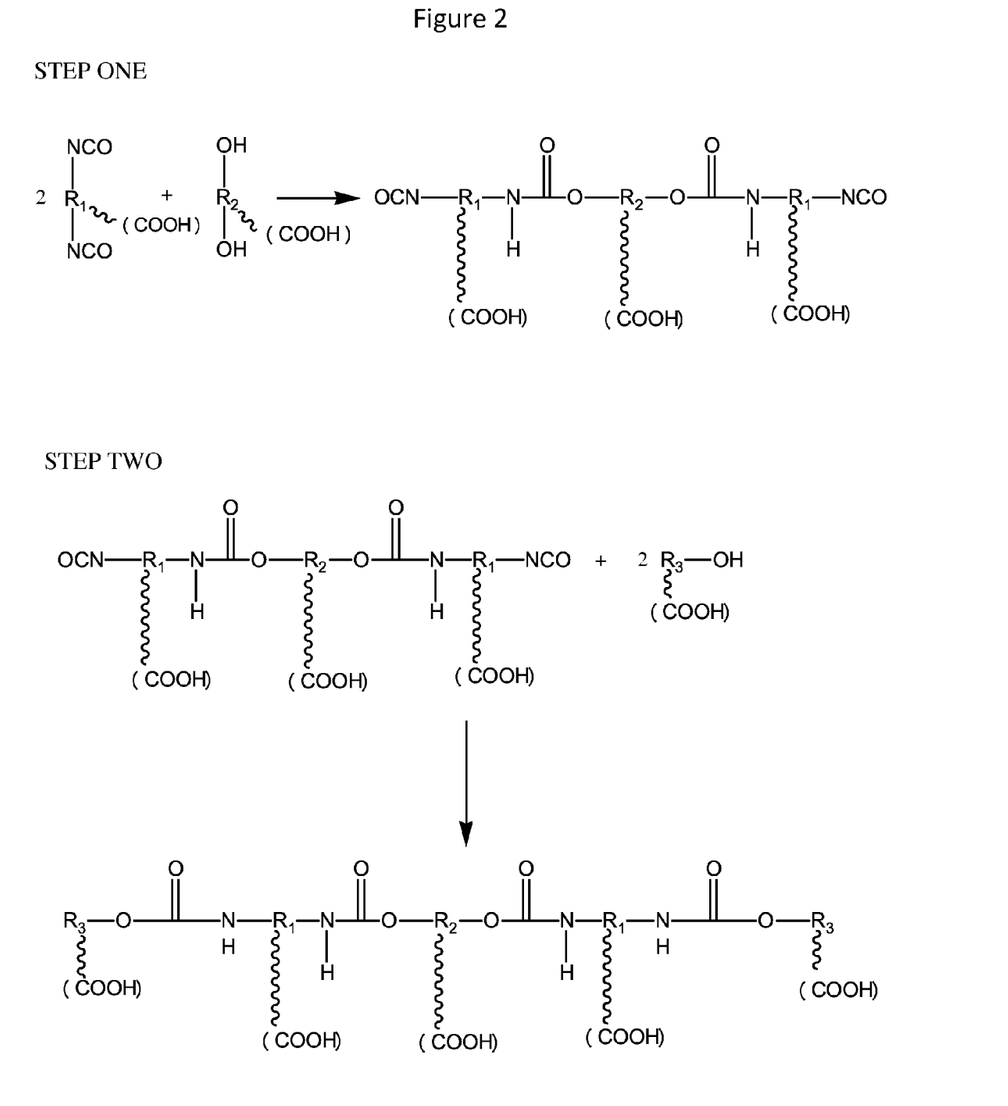
FIG. 2 is a schematic illustration of the formation of a urethane oligomer containing pendant carboxylic acid (polyurethane oligomer) according to at least one exemplary embodiment of the present invention.

As shown in step 1 of FIG. 2, the urethane oligomer containing pendant carboxylic acid (Formula II) can be formed from the reaction of diisocyanates and polyols where one or both of the diisocyanates and polyols contain carboxylic acid pendants in their structures. It should be appreciated that the selection of the polyol is not particularly limited. For example, the polyol may be glycerin (or any higher oligomer of glycerin) or any other high functionality polyol or oligomers thereof. In some exemplary embodiments, polyamines (primary or secondary) can be used in place of the polyols to generate urea linkages between the diisocyanate moieties. The terminal isocyanate moieties of the pre-polymers are then reacted with an alcohol, $R^3$—OH, in step 2 of FIG. 2 to block the isocyanate and eliminate the presence of free isocyanate functional groups. As shown, the $R^3$—OH alcohol structure in step 2 may also contain one or more pendant carboxylic acid functional groups. In addition, it should be noted that amines, either primary or secondary, can be used in place of the alcohol in some exemplary embodiments to block the end isocyanate and to generate urea bonds.

An alternative method for forming urethane oligomers is the use of cyclocarbonates and amines as taught by U.S. Pat. No. 5,175,231 to Rappoport, et al. The cyclocarbonate-amine route has an advantage in that no isocyanates are used at all, yet the resulting bond is still a carbamate as in urethanes. Amide-based oligomers having urea linkages can be prepared using diisocyanates and water. The isocyanate reacts with water to form an unstable carbamic acid, which decomposes to the amine and the amine reacts with additional isocyanate molecules to form the urea linkages.

As shown in FIG. 2 and Formula II, the urethane prepolymer segments and carboxylic acid functional groups are attached to the same compound. It is to be appreciated that although four urethane segments and five —COOH groups are depicted in FIG. 2 and Formula II, any number of polyurethane segments and —COOH groups can be present. The urethane groups attached to the backbone of the urethane oligomer containing pendant carboxylic acid (Formula II) are non-reactive, and as a result, no harmful chemicals are emitted during installation of the foam. In addition, there are no free isocyanate moieties generated during the crosslinking and formation of the polyurethane oligomer or during the formation of the foam that may be potentially hazardous to workers installing or working with the foam. The presence of the urethane oligomer segments permits for the generation of a polyurethane foam without the conventional drawbacks conventional polyurethane foams such as the formation of methylene-diphenyl-di-isocyanate MDI monomers.

The B-side of the foam composition, as indicated previously, contains a polyfunctional aziridine crosslinking agent and optionally a plasticizer and/or a non-reactive resin. The non-reactive resin is a resin that does not react with the polyfunctional aziridine crosslinking agent, but is otherwise non-limiting. Examples of suitable polyfunctional amines include XAMA®-7 and XAMA®-2, tri-functional aziridines from Bayer Corporation; PZ-28 and PZ-33, ethylene imine-based tri-functional aziridines available from PolyAziridine, LLC; Crosslinker CX-100, a polyfunctional aziridine available from DSM NeoResins; crosslinker QL-A1000, a polyfunctional aziridine available from Wuhan Qianglong Chemical New Materials Company, Ltd. and XC-103, a trifunctional aziridine available from Zealchem. The polyfunctional aziridine crosslinking agent may be present in the B-side in an amount from about 3.0 to about 30 percent by weight of the dry foam composition, preferably in an amount from about 1.0 to about 20 percent by weight. Although a mole ratio of the resin functional groups to the polyfunctional aziridine crosslinking agent functional groups of 1:1 is preferred, this molar ratio is variable and may encompass a wider range, such as, for example, from 0.5:1 to 2:1 to provide the optimum crosslinking in the final foam products.

The A- and/or B-side may also contain a plasticizer to adjust the viscosity of the respective sides. The plasticizer for use in the A-side is not particularly limiting, and includes plasticizers such as phthalate ester, dimethyl adipate, dimethyl phthalate, epoxidized crop oils (e.g., Drapex 10.4, Drapex 4.4, and Drapex 6.8 available from Chemtura). The plasticizer for use in the B-side may be any plasticizer that does not contain any acidic protons that may react with the aziridine groups in the crosslinking agent. The plasticizer may be present in the foamable composition in an amount from about 0 to about 60% by weight of the dry foam composition. Examples of suitable plasticizers for use in the B-side of the foamable composition include butyl benzoate, Benzoflex® 2088 (a benzoate ester plasticizer available from Genovique Specialties), Benzoflex® LA-705 (a benzoate ester plasticizer available from Genovique Specialties), Triton® X-100 (an octylphenoxypolyethoxyethanol available from Cognis), PEG-400 (a polyethylene glycol available from Cognis), Citroflex® 2 (a triethyl citrate available from Vertellus® Specialties), and Citroflex® 4 (a tributyl citrate available from Vertellus® Specialties). In exemplary embodiments, the plasticizer is a benzoate ester or a citric acid ester. Desirably, the plasticizer is present in an amount from about 0 to about 60% by weight, or from about 0 to about 30% by weight.

According to one aspect of the invention, the crosslinking agent is diluted by a plasticizer. The plasticizer should have no acidic protons to react with the aziridine groups in the crosslinking agent. Diluting the polyfunctional aziridine crosslinking agent with a plasticizer provides several advantages. For example, the toxic components of the polyfunctional aziridine (e.g. ppm quantities of ethyleneimine, which is a very reactive moiety) can be eliminated in the benzoate ester plasticizer to reduce health risks to those in contact with the polyfunctional aziridine. Also, the plasticizer allows the foam composition to be delivered with standard plural component spray equipment, thereby negating the need for any specialized equipment.

Additionally, the presence of the plasticizer permits for the inclusion of other solid materials that may add functionality and/or cost savings to the final foamed product. For instance, coacervating agents, fillers (e.g., calcium carbonate and wollastonite fibers), nucleating agents (e.g., talc), and/or foaming agents (e.g., sodium bicarbonate) can be included in the B-side of the foamable composition. It is to be appreciated that when the plasticizer and other components in the B-side do not contain any acidic protons, the B-side is stable for extended periods of time, such as up to at least six months or more.

In addition to the components set forth above, the A-side and/or the B-side contains a blowing agent. The blowing agent may be a chemical compound that, when heat or light activated, forms a gas. The generated gas may be $CO_2$, $N_2$, $O_2$, $H_2$, or other non-carcinogenic, gases. For instance, azodicarbonamide is a chemical compound that, upon heating, releases $N_2$ gas, and would be a suitable blowing agent in the foamable composition. Additionally, alkylsiloxanes, which may release $H_2$ when reacting with amine hardeners, may be used as a blowing agent in the instant invention. Other examples include diazo compounds (i.e., $CH_2N_2$) and aliphatic azide (i.e., R—N=N=N), which decompose on irradiation to give nitrogen gas, and 1-naphtyl acetic acid and n-butyric acid, which generate carbon dioxide ($CO_2$) upon photodecarboxylation. Phase change blowing agents such as low boiling point hydrocarbons (e.g., cyclopentane and n-pentane) and inert gases such as air, nitrogen, carbon dioxide can also be used. It is to be appreciated that the chemical compound is not a conventional blowing agent in the sense that it is a hydro-fluorocarbon (HFC) or a hydro-chloro-fluorocarbon (HCFC) blowing agent. Additionally, the blowing agent may be formed of more than one blowing agent (e.g., blowing agent package), such as, for example, the combination of a chemical blowing agent and a gas (e.g. HFC blowing agent). The blowing agent package may alternatively be the combination of two or more chemicals or compounds that when mixed together form a gas (e.g., an acid and a base). The A-side and the B-side may be added in weight ratios (A:B) from about 4:1 to about 1:2; for example 3:1, 2:1, 1.5:1, 1:1, 1:1.5 etc.

Also, the A-side and/or the B-side may contain one or more surfactants to lower surface tension, to emulsify incompatible formulation ingredients, to promote the nucleation of bubbles during mixing, to stabilize the rising foam by reducing stress concentrations in thinning cell-walls, and to counteract the defoaming effect of any solids added to or formed during the foam reaction. Useful surfactants include, but are not limited to, silicone surfactants, siloxane-polyoxyalkylene block copolymers such as Niax Silicone L-6900 (available commercially from GE Silicones (Friendly, W. Va.); Dabco DC-5598 (a silicone surfactant commercially available from Air Products and Chemicals, Inc. (Allentown, Pa.); Tegostab B 8512 (a silicone surfactant commercially available from Goldschmidt Chemical Corp. (Essen, Germany)); and Vorasurf 504 (a non-silicone surfactant commercially available from Dow Chemical Co. (Midland, Mich.)). The surfactant may be present in the A- and/or B-side in an amount from about 0 to about 10.0% by weight of the dry foam composition.

Further, the A-side and B-side may contain a thickening agent or rheology modifier to adjust the viscosity of the foam. It is desirable that the A-side and the B-side have the same or nearly the same viscosity to achieve proper mixing and to control the rate of the crosslinking reaction. This permits for easy application and mixing of the components of the A-side and B-side. Suitable examples of thickening agents for use in the foamable composition include Acrosol RM 895, calcium carbonate, methyl cellulose, ethyl cellulose, hydroxyethyl cellulose (e.g., Cellosize® HEC available from Union Carbide), alkaline swellable polyacrylates (e.g., Paragum 500 available from Para-Chem), sodium polyacrylates (e.g., Paragum 104 available from Para-Chem), bentonite clays, and Laponite® RD clay (a synthetic layered silicate), glass fibers, cellulose fibers, polyethylene oxide, and talc.

An optional but desirable component of the foaming composition is a rheology modifier. Rheology modifiers, also known as thixotropes, are compounds that affect the flow properties of a liquid. A thixotropic mixture has high viscosity at low shear and lower viscosity when sheared (e.g. shaken or stirred). In foam compositions of the invention, rheology modifiers help keep the reactant in place until the reaction is complete.

Many rheology modifiers are clays or modified clays. Clay is common name for a wide variety of weathered mineral or igneous rock, largely feldspar. Various classification schemes, such as the Nickel-Strunz classification, divide up mineral clays according to composition and/or structure. Suitable rheology modifiers may be found in the kaolinite group, the smectite or montmorillonite group and the illite group. Generally, these groups contain sheets or layers formed of specific tetrahedral and/or octahedral structures of aluminum and silicon oxides. The layers or platelets are held together by ionic bonds with charged ions (usually cations) located between the layers. The Nickel-Strunz classification (version 10) divides silicates (group 9) into nine different subcategories, the most useful being phyllosilicates (group 9E), which itself is divided into nine subcategories, the two most useful being 9EC (with mica sheets) and 9ED (with kaolin layers). Exemplary clays from these groups include kaolin, montmorillonite or smectite, talc, mondorite, nontronite, muscovite, vermiculite, saponite, hectorite, rectorite, and minnesotaite. Bentonite is a useful impure clay largely containing montmorillonite.

It is the layers or "platelets" of phyllosilicates that give them many of their properties, including the plasticity for use as pottery. When the layers are of thickness dimensions in the few nanometer range, they are often referred to as nanoclays. An example is the NANOLIN DK series of nanoclays available from Zhejiang Fenghong Clay Chemicals Co., LTD., which are made from highly purified smectite that exhibits ultra-fine phase dimensions. The size of these nanoclays is typically in the range of 1-100 nm while been fully dispersed, the average fully dispersed thickness of platelet is around 25 nm; the aspect ratio is 100-1000.

Modified clays are formed when various processes are used to separate and expand the layers or platelets. Intercalation, exfoliation and fuming are processes that modify the layered structure. Intercalation inserts a polymer or other molecule between the platelet layers to isolate them, but without much physical separation. Exfoliation, on the other hand inserts a polymer or molecule and expands the space between layers by 10-20 fold. Fuming is a flaming process that introduces hydroxyl groups onto the surface of the silica structures.

A specific type of modified clay that impacts hydrophilicity and solubility produces clays known as "organoclays." Organoclays are modified by the replacement of the cation (usually sodium) between layers with alkylammonium ($R_4N^+$) compounds, a type of surfactant. The nitrogen end of the quaternary amine, the hydrophilic end, is positively charged, and ion exchanges onto the clay platelet for sodium or calcium. The amines used generally have long chain R groups with 12-18 carbon atoms, making them more compatible with many organic polymers. After about 30 percent of the clay surface is coated with these amines it becomes hydrophobic and, with certain amines, organophilic. Additionally, exfoliation of organoclays becomes easier since there is a larger distance between the platelets due to the bigger size of the ammonium salts compared to sodium ions.

Some non-limiting examples of the many clay-based rheology modifiers include Laponite and Garamite 1958 (Southern Clay Products). Some non-limiting examples of the many rheology modifiers based on fumed alumina or fumed silica, include Aerosil and Cab-O-sil® TS-720 (Cabot Corp.)

In the spray foam of the present invention, the A- or B-side may also include other optional, additional components such as, for example, foam promoters, opacifiers, accelerators, foam stabilizers, dyes (e.g., diazo or benzimidazolone family of organic dyes), color indicators, gelling agents, flame retardants, biocides, fungicides, algaecides, fillers, and/or conventional blowing agents. It is to be appreciated that a material will often serve more than one of the aforementioned functions, as may be evident to one skilled in the art, even though the material may be primarily discussed only under one functional heading herein. The additives are desirably chosen and used in a way such that the additives do not interfere with the mixing of the ingredients, the cure of the reactive mixture, the foaming of the composition, or the final properties of the foam.

As described above, it is desirable that the A-side and the B-side have the same or nearly the same viscosity to permit easy application and mixing of the components of the A-side and B-side. The thickening agents may be present in the A-side and the B-side, respectively, in an amount up to about 50% by weight of the dry foam composition. In at least one exemplary embodiment, the amount of thickening agent present in the A-side is from about 0.1 to about 10.0% by weight, based on the dry foamable composition, and the amount of thickening agent present in the B-side is from about 0.1 to about 10.0% by weight, based on the dry foamable composition, depending upon the nature of the thickening agent.

The A- or B-side may also include other optional, additional components such as, for example, foam promoters, opacifiers, accelerators, foam stabilizers, dyes (e.g., diazo or benzimidazolone family of organic dyes), color indicators, gelling agents, flame retardants, biocides, fungicides, algaecides, corrosion inhibitors, fillers, and/or conventional blowing agents. It is to be appreciated that a material will often serve more than one of the aforementioned functions, as may be evident to one skilled in the art, even though the material may be primarily discussed only under one functional heading herein. The additives are desirably chosen and used in a way such that the additives do not interfere with the mixing of the ingredients, the cure of the reactive mixture, the foaming of the composition, or the final properties of the foam.

To form a two-part spray foam of the present invention, the components of the A-side and the components of the B-side are delivered through separate lines into an application device, such as an impingement-type spray gun. The two components are pumped through small orifices at high pressure to form streams of the individual components of the A-side and the B-side. The streams of the first and second components intersect and mix with each other within the gun and begin to react. Depending on the components of the blowing agent package in the A-side and the B-side, the gas generated may be $CO_2$, $N_2$, $O_2$, $H_2$, or other non-carcinogenic gases. The foaming reaction occurs until all of the blowing agent(s) have been reacted and no more gas is generated.

Figure 3:
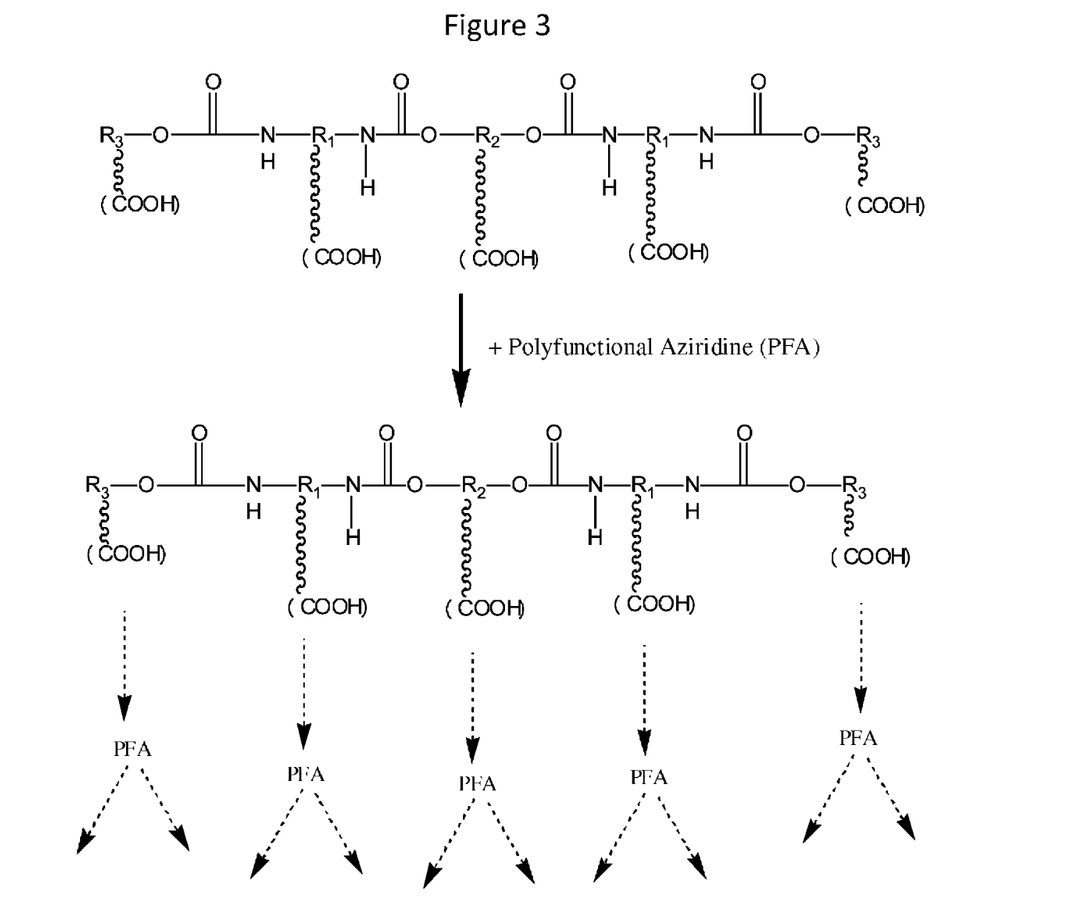
FIG. 3 is a schematic illustration of the crosslinking between the carboxylic acid groups of the inventive amide oligomer and polyfunctional aziridine to form a crosslinked polymer network according to another aspect of the present invention. When a low boiling point blowing agent is present, the heat of the reaction (or the application of some external heat) will result in foaming of the above mentioned polymer structure.

As shown pictorially in FIG. 3, the polyfunctional aziridine reacts with the pendant carboxylic acid groups positioned on the amide-based oligomer (Formula I or II set forth above) to create a polymeric structure. The polyfunctional aziridine (PFA) has further reactive groups (e.g. two more as represented by two additional arrows in FIG. 3) to react with and bind more —COOH groups on additional oligomer molecules to form a complex or network within the polymeric structure. The polymeric structure can turn into an optimal foam when the rate of the crosslinking reaction between the polyfunctional aziridine/carboxylic acid and rate of the formation of gas (from blowing agent) are adjusted to occur at the same time, and both occur rapidly. It should be noted that the polyurethane oligomers contain no free isocyanates and the reaction between the crosslinking agent and the carboxylic groups is the primary means of crosslinking.

Additionally, it is to be appreciated that the crosslinking is important for capturing the bubbles generated by the evolution of the gas in their original, fine structure before they can coalesce and escape the foam. A fine foam structure is more desirable and more beneficial than a coarse foam structure in order to achieve high thermal performance. Also, the crosslinking of the functional groups on the polyurethane oligomer quickly builds strength in the foam and permits the foam to withstand the force of gravity when it is placed, for example, in a vertical wall cavity during application. The reaction is so rapid that the final foamed product becomes cured to the touch within minutes to seconds after application. In exemplary foamed products, the foam hardens to touch within about 5 minutes, within about 2 minutes, within about 1 minute or within about 30 seconds. The foam may be completely cured for handling within about 20 minutes, within about 15 minutes or within about 10 minutes. The resulting resistance to heat transfer, or R-value, may be from about 3.5 to about 8 per inch. It is also to be appreciated that the foam formed may have an open or closed cell structure and that the oligomer can be modified to result in a rigid or a flexible polyurethane foam.

In one exemplary embodiment of the invention, a phase change blowing agent is utilized as the blowing agent. To form a foam utilizing a phase change blowing agent such as a low boiling point hydrocarbon or inert gas, a urethane oligomer containing pendant carboxylic acid, crosslinking agent, and phase change blowing agent are pressurized, such as in a pressurized spray-type container. Upon mixing the two sides, the carboxylic acid functional group on the polyurethane oligomer reacts with the polyfunctional aziridine crosslinking agent to form the polymer backbone, the blowing agent is released from the pressurized container (e.g., released into atmospheric pressure), and the blowing agent changes from a liquid to a gas to initiate the foaming reaction to foam the polymer backbone. The foaming reaction continues until all the blowing agent has been converted into a gas and all the aziridine groups have been reacted.

In an alternate embodiment, a one-part foam composition is provided. In this exemplary embodiment, one or more of the reactive crosslinking ingredients, e.g. the polyfunctional aziridine of the B-side, is encapsulated and added to the first component (described above), thereby creating a one-part foam composition. Specifically, the polyfunctional aziridine crosslinking agent is encapsulated in a protective, non-reactive shell that can be broken or melted at the time of the application of the foam. In the instance that an acid and a base are used as the blowing agent, the base (contained in the B-side) is also encapsulated. The polyfunctional aziridine (and the base id present) may be encapsulated in one or two encapsulating shells. For example, the crosslinking agent (and base if present) may be encapsulated in a wax or gelatin that can be melted at the time of the application of the foam. Desirably, the wax has a melting point from about 120° F. to about 180° F., and more preferably has a melting point from about 120° F. to about 140° F. Alternatively, the encapsulating shell may be formed of a brittle polymer (such as a melamine formaldehyde polymer) or an acrylic that can be broken or sheared at the time of the application of the foam to initiate the foaming reaction. The protective shell(s) surrounding the crosslinking agent (and base if present) may be heat activated, shear activated, photo-activated, sonically destructed, or activated or destroyed by other methods known to those of skill in the art.

Optionally, the encapsulating material may be a low melting, semi-crystalline, super-cooled polymer. Non-limiting examples of low melting polymers include polyethylene oxide (PEO) and polyethylene glycol (PEG). A preferred low-melting polymer for use as an encapsulant is a polyethylene oxide that has an average molecular weight from about 100,000 Dalton to about 8,000,000 Dalton. Additionally, the glass transition temperature ($T_g$) of the super-cooled polymer may be adjusted to the application temperature of the reaction system by blending polymers. For example, polymer blends such as a blend of polyvinylchloride (PVC) and polyethylene oxide (PEO) may be used to "fine tune" the glass transition temperature and achieve a desired temperature at which the polymer melts or re-crystallizes to release the crosslinking agent and base. With a PVC/PEO blend, the desired glass transition temperature is a temperature between the $T_g$ of polyvinyl chloride and the $T_g$ of the polyethylene oxide and is determined by the ratio of PVC to PEO in the polymer blend. When the super-cooled polymer is heated above its glass transition temperature, such as in a spray gun, the polymer re-crystallizes and the crosslinking agent and base is expelled from the polymer. This expulsion of the crosslinking agent and base is due to the change in free volume that occurs after re-crystallization of the polymer.

The combination of the A-side components and the encapsulated polyfunctional aziridine crosslinking agent and blowing agent(s) may be mixed to form a dispersion. The dispersion is substantially non-reactive because the polyfunctional aziridine crosslinking agent remains encapsulated within the encapsulating shell. The phrase "substantially non-reactive"

as used herein is meant to indicate that there is no reaction or only a minimal reaction between the A-side components and the encapsulant in the dispersion. As a result, the one-part foamable reactive composition is stable for extended periods of time.

A single stream of the dispersion containing the polyurethane oligomer, encapsulated crosslinking agent, and blowing agent, and optional surfactants, plasticizers, thickening agents, and/or co-solvents may then be fed into an application gun, such as a spray gun, that has the ability to mix and/or heat the dispersion within the gun. The one-part foam of the present invention requires no expensive or complicated spraying equipment, and is a simple gun, a simple diaphragm, or drum pump. These types of guns are less likely to clog and are also easy to maintain and clean.

Once the dispersion is inside the gun, the crosslinking agent and base are released from the encapsulating material. For example, the dispersion may be heated within the gun to a temperature above the melting point of the long chain polymer or wax containing the polyfunctional aziridine crosslinking agent and base so that the crosslinking agent and base are released from the polymer or wax. In addition, the mixing action within the gun may assist in the release of the polyfunctional aziridine crosslinking agent and base from the encapsulant. Alternatively, the encapsulating shell of the crosslinking agent and base may be shear activated, sonically activated, photo activated, or destroyed by any other suitable method known to those of skill in the art. Once the crosslinking agent is released from the polymer shell, crosslinking between the crosslinking agent and the functional groups on the polyurethane oligomer begins to form the polymer structure. The simultaneously reacting mixture is sprayed from the gun to a desired location where the mixture continues to react and form either open or closed cell foams. The foam may have an R-value from about 3.5 to about 8 per inch.

In use, the inventive foams may be sprayed into either an open cavity, such as between wall studs, or into a closed cavity where it expands to seal any open spaces. The application is desirably a continuous spray process. Alternatively, the foams may be applied in a manner to fill or substantially fill a mold or fed into an extruder or an injection molding apparatus, such as for reaction injection molding (RIM), and used to form items such as cushions, mattresses, pillows, and toys. For example, a polyurethane oligomer, a polyfunctional aziridine crosslinking agent, and a blowing agent may be mixed and applied to a mold where the crosslinking agent reacts with the polyurethane oligomer while the blowing agent degrades or reacts to form a gas and initiate the foaming reaction.

The foams of the present invention may be used to insulate buildings such as homes from temperature fluctuations outside of the building's envelope. In addition, the foams of the present invention are preferably non-structural foams. The foams may serve both as a conductive and a convective thermal barrier. The foams of the present invention may also serve as a sealant or barrier to air infiltration by filling cracks and/or crevices in a building's roof or walls. Additionally, the foams may be used to form a barrier to seal cracks or crevices around doors, windows, electric boxes, and the like.

Another advantage of the foams of the present invention is the safe installation of the foam into cavities. The foams do not release any harmful vapors into the air when applied or sprayed. Therefore, the inventive foams reduce the threat of harm to individuals working with or located near the foam. In addition, the application of the foams is more amenable to the installer as he/she will not need to wear a special breathing apparatus during installation.

Another advantage of the inventive foams is that it can be used in the renovation market, as well as in houses that are occupied by persons or animals. Existing, conventional spray polyurethane foams cannot be used in these applications because of the generation of high amounts of free isocyanate monomers that could adversely affect the occupants of the dwelling. As discussed above, exposure of isocyanate monomers may cause irritation to the nose, throat, and lungs, difficulty in breathing, skin irritation and/or blistering, and a sensitization of the airways.

Yet another advantage of the present invention is that the toxic components of the polyfunctional aziridine can be eliminated with a plasticizer(s) to reduce health risks to those in contact with the polyfunctional aziridine. In addition, diluting the polyfunctional aziridine crosslinking agent reduces the viscosity of the B-side so that the components of the B-side can be better mixed with the A-side in the spray gun. Also, the plasticizer in the B-side permits the foam composition to be delivered with standard plural component spray equipment, thereby negating the need for any specialized equipment.

It is further advantageous that the inclusion of the plasticizer in the B-side allows for the inclusion of other solid materials that may add functionality and/or cost savings to the final foamed product. Additionally, the B-side is stable for extended periods of time as long as there are no acidic protons present in the B-side components.

It is also an advantage of the present invention is that the components of the one-part or two-part foam compositions are carefully chosen to result in a tacky or sticky foam that can be used to hold the fiberglass batt in place when used to fill cracks or crevices. Such tackiness is desirably when flash and batt systems are employed.

The invention of this application has been described above both generically and with regard to specific embodiments. Although the invention has been set forth in what is believed to be the preferred embodiments, a wide variety of alternatives known to those of skill in the art can be selected within the generic disclosure. For example, three or more part foams are contemplated as being within the one and two part foams described herein. It is rarely, if ever, necessary to separate reactive ingredients into three or more parts; two components suffice in most instances, whether by encapsulation or distinct, isolated formulations. The invention is not otherwise limited, except for the recitation of the claims set forth below.

What is claimed is:

1. A foamable composition for forming a non-isocyanate foam comprising:
    a first component including at least one amide-based oligomer containing pendant carboxylic acid groups and no isocyanate groups, wherein said at least one amide-based oligomer has the following formula:

wherein $R_1$ is selected from alkyl, cycloalkyl and aromatic,
wherein $R_2$ is selected from a polyether, a polyester, a polyether-polyester blend, a caprolactone, alkyl, cycloalkyl, and aromatic,
wherein $R_3$ is selected from glycerin, oligomers of glycerin, alkyl, aromatic, and cycloaliphatic,
wherein each "COOH" represents a potential location of pendant —COOH groups, provided that at least one of $R_1$, $R_2$ and $R_3$ comprise at least one —COOH,
wherein X and Z are independently selected from NH or O, and wherein n is an integer from about 1 to about 50; and
a second component including a polyfunctional aziridine cross linking agent that crosslinks with carboxylic acids groups rapidly at or about room temperature,
wherein at least one of said first component and said second component contains a blowing agent, and wherein the first and second components are isolated from one another until a foaming reaction is desired.

2. The foamable composition of claim 1, wherein at least one of X and Z is O, thereby making the amide-based oligomer a urethane oligomer.

3. The foamable composition of claim 1, wherein at least one of X and Z is NH, thereby making the amide-based oligomer a urea oligomer.

4. The foamable composition of claim 1, wherein one of X and Z is O and the other of X and Z is NH, thereby making the amide-based oligomer a mixed urea-urethane oligomer.

5. The foamable composition of claim 1, wherein n is from about 3 to about 20.

6. The foamable composition of claim 1, wherein said first component further includes at least one member selected from a first plasticizer, a rheology modifier, and a surfactant.

7. The foamable composition of claim 1, wherein said second component further includes a second plasticizer, said second plasticizer having no acidic protons to react with said polyfunctional aziridine crosslinking agent.

8. The foamable composition of claim 7, wherein said second plasticizer is selected from the group consisting of a benzoate ester, a triethyl citrate, a tributyl citrate, polyethylene glycol, an octylphenoxypolyethoxyethanol, butyl benzoate and combinations thereof.

9. The foamable composition of claim 1, wherein the first and second components are isolated in separate containers.

10. The foamable composition of claim 1, wherein a reactive ingredient in at least one of the first component and the second component is encapsulated in a protective, non-reactive shell.

11. The foamable composition of claim 10, wherein said polyfunctional aziridine crosslinking agent of the second component is encapsulated in the protective, non-reactive shell.

12. The foamable composition of claim 1, wherein at least one of said first component and said second component further comprises one or more members selected from the group consisting of surfactants, thickening agents, rheology modifiers, plasticizers, foam promoters, opacifiers, accelerators, foam stabilizers, dyes, color indicators, gelling agents, flame retardants, biocides, fungicides, algaecides and fillers.

13. The foamable composition of claim 1, wherein said blowing agent is selected from the group consisting of a single chemical compound that generates a gas upon heating, irradiation, or photo initiation; two or more chemicals that form a gas upon mixing; and a phase change blowing agent.

14. A non-isocyanate foamed product comprising the reaction product of:
a first component including at least one amide-based oligomer containing pendant carboxylic acid groups and no isocyanate groups, wherein said at least one amide-based oligomer has the following formula:

wherein $R_1$ is selected from alkyl, cycloalkyl and aromatic,
wherein $R_2$ is selected from a polyether, a polyester, a polyether-polyester blend, a caprolactone, alkyl, cycloalkyl, and aromatic,
wherein $R_3$ is selected from glycerin, oligomers of glycerin, alkyl, aromatic, and cycloaliphatic,
wherein each "COOH" represents a potential location of pendant —COOH groups, provided that at least one of $R_1$, $R_2$ and $R_3$ comprise at least one —COOH,
wherein X and Z are independently selected from NH or O, and
wherein n is an integer from about 1 to about 50; and
a second component including a polyfunctional aziridine cross linking agent that crosslinks with carboxylic acids groups rapidly at or about room temperature,
wherein at least one of said first component and said second component contains a blowing agent, and wherein the first and second components are isolated from one another until a foaming reaction is desired.

15. The foamed product of claim 14 wherein at least one of X and Z is O.

16. The foamed product of claim 15, further comprising one or more members selected from the group consisting of surfactants, thickening agents and plasticizers.

17. The foamed product of claim 15, wherein the blowing agent is selected from the group consisting of a single chemical compound that generates a gas upon heating, irradiation, or photo initiation, two or more chemicals that form a gas upon mixing and a phase change blowing agent.

* * * * *